United States Patent
Harris et al.

(10) Patent No.: US 11,057,392 B2
(45) Date of Patent: Jul. 6, 2021

(54) DATA SECURITY METHOD UTILIZING MESH NETWORK DYNAMIC SCORING

(71) Applicant: Visa International Service Association, San Francisco, CA (US)

(72) Inventors: Theodore D. Harris, San Francisco, CA (US); Yue Li, San Mateo, CA (US); Tatiana Korolevskaya, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/053,149

(22) PCT Filed: May 15, 2018

(86) PCT No.: PCT/US2018/032799
§ 371 (c)(1),
(2) Date: Nov. 5, 2020

(87) PCT Pub. No.: WO2019/221713
PCT Pub. Date: Nov. 21, 2019

(65) Prior Publication Data
US 2021/0112068 A1    Apr. 15, 2021

(51) Int. Cl.
*H04L 29/06*    (2006.01)
(52) U.S. Cl.
CPC .......... *H04L 63/104* (2013.01); *H04L 63/107* (2013.01); *H04L 63/20* (2013.01)
(58) Field of Classification Search
CPC ...... H04L 63/104; H04L 63/20; H04L 63/107
USPC .......................................................... 726/4
See application file for complete search history.

(56) References Cited

U.S. PATENT DOCUMENTS

| 2014/0330901 | A1* | 11/2014 | Chang | H04W 84/18 709/204 |
| 2014/0362836 | A1* | 12/2014 | Locker | H04W 4/80 370/338 |
| 2016/0073271 | A1* | 3/2016 | Schultz | H04W 4/90 455/404.1 |

(Continued)

OTHER PUBLICATIONS

J. L. Salmon and R. Yang, "A Proximity-Based Framework for Mobile Services," 2014 IEEE International Conference on Mobile Services, Anchorage, AK, USA, 2014, pp. 124-131, doi: 10.1109/MobServ.2014.26. (Year: 2014).*

(Continued)

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

A method is disclosed. A user device may determine, prior to joining a mesh network comprising a plurality of user devices, a first data security value. The user device may then communicate with the plurality of user devices to join the mesh network. The user device may receive a plurality of additional data security values from a plurality of proximate user devices. The user device may then determine an updated data security value based at least upon evaluating the plurality of additional data security values associated with the plurality of proximate user devices. The user device may allow or not allow the user device to perform an interaction based at least upon the updated data security value.

18 Claims, 8 Drawing Sheets

(56) References Cited

U.S. PATENT DOCUMENTS

| | | | |
|---|---|---|---|
| 2016/0098724 A1* | 4/2016 | Bishop | G06Q 20/382 |
| | | | 705/21 |
| 2016/0150459 A1* | 5/2016 | Patil | H04W 40/02 |
| | | | 370/328 |
| 2016/0212165 A1* | 7/2016 | Singla | H04L 63/1433 |
| 2016/0217219 A1* | 7/2016 | Fuka | G06Q 20/4014 |
| 2017/0293873 A1* | 10/2017 | Chrapko | G06Q 40/08 |

OTHER PUBLICATIONS

K. R. Chowdhury and I. F. Akyildiz, "Cognitive Wireless Mesh Networks with Dynamic Spectrum Access," in IEEE Journal on Selected Areas in Communications, vol. 26, No. 1, pp. 168-181, Jan. 2008, doi: 10.1109/JSAC.2008.080115. (Year: 2008).*
Application No. PCT/US2018/032799, International Search Report and Written Opinion, dated Jan. 8, 2019, 11 pages.

* cited by examiner

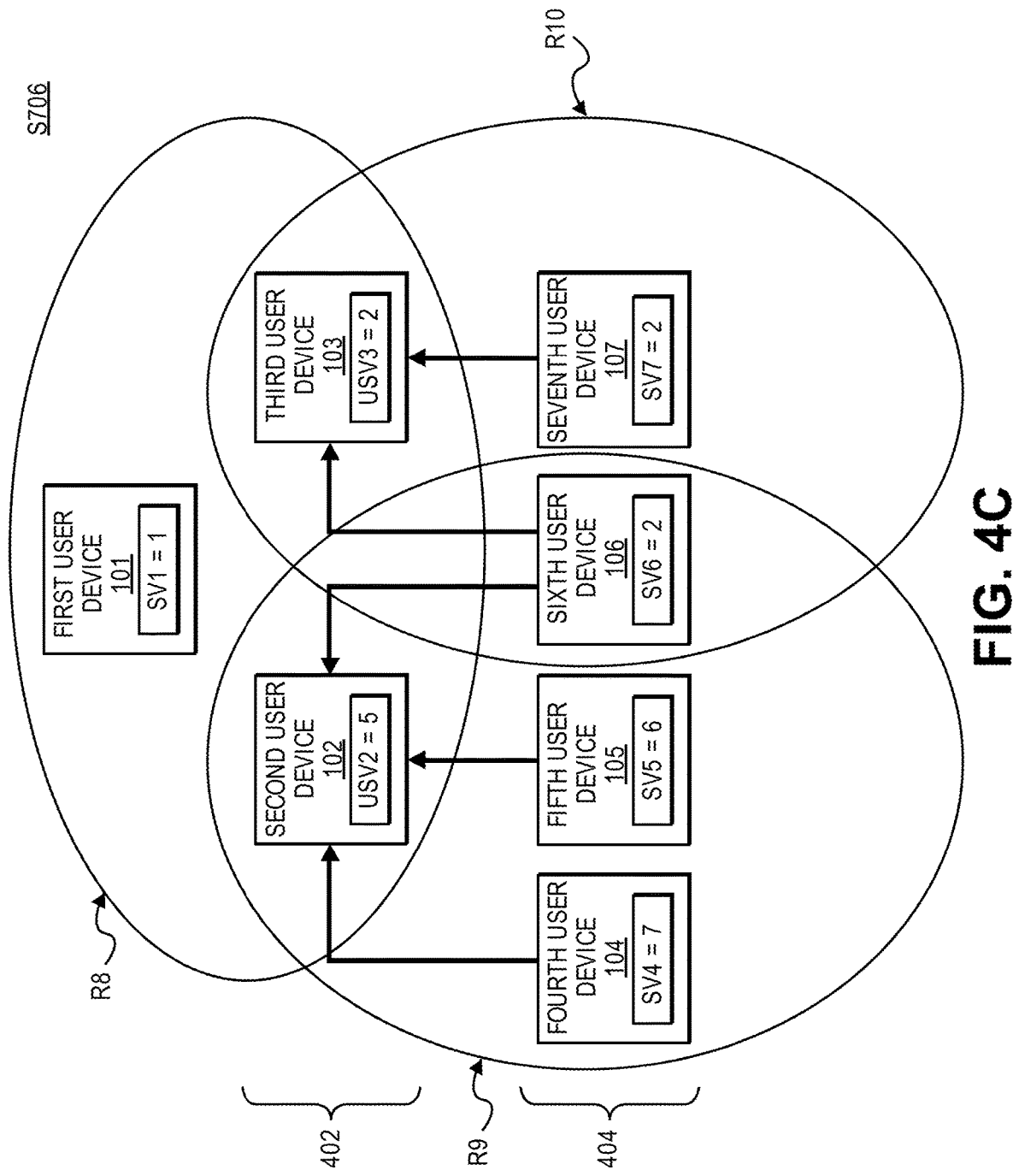

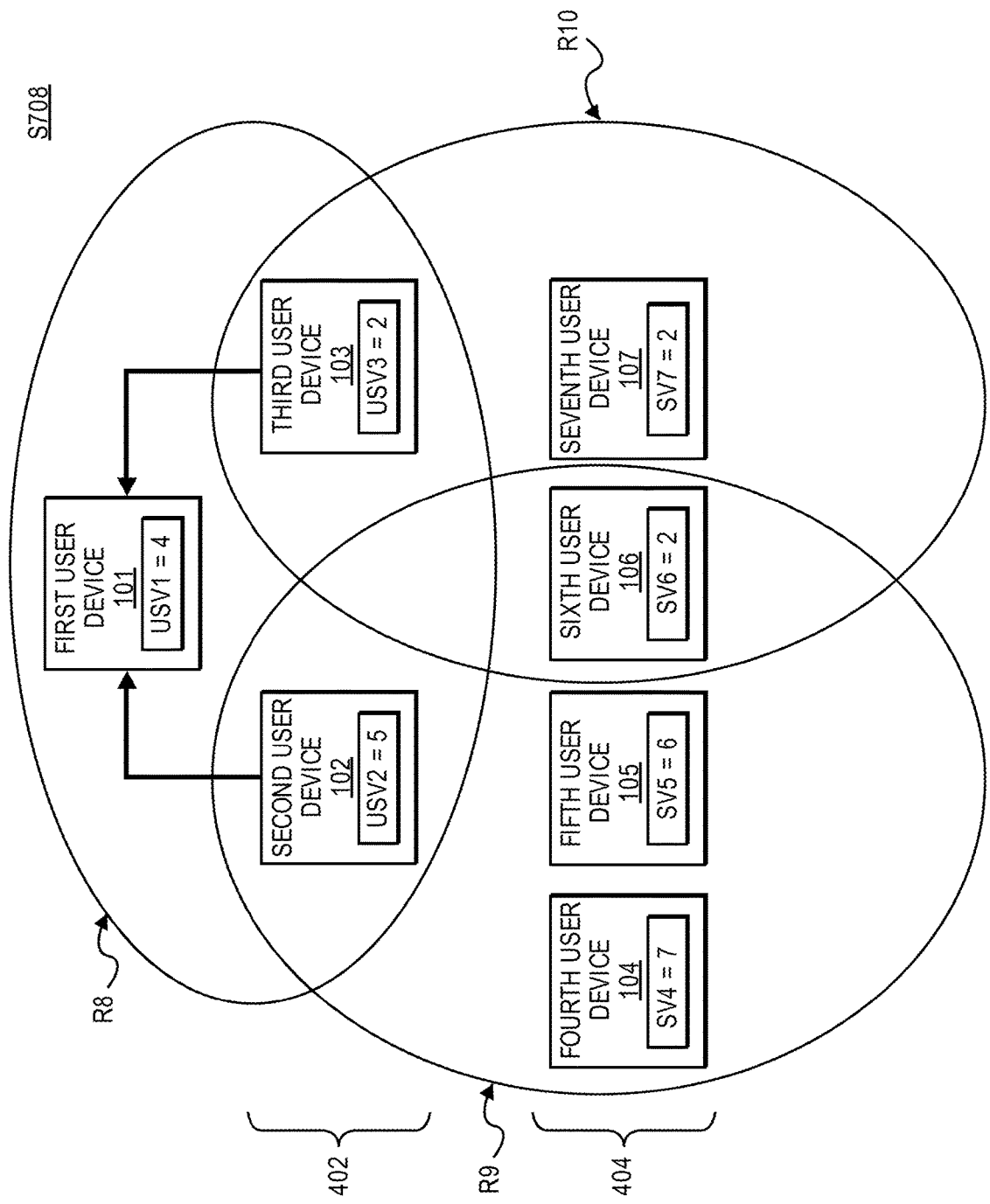

Device's user is bad and device compromised.

DATA SECURITY METHOD UTILIZING MESH NETWORK DYNAMIC SCORING

CROSS-REFERENCES TO RELATED APPLICATIONS

This application is a 371 National Stage of International Application No. PCT/US2018/032799 International Filing Date May 15, 2018, which is herein incorporated by reference.

BACKGROUND

Users rely on their mobile phones to perform a variety of tasks including taking and sharing photos, receiving news updates, engaging in mobile banking, conducting payments, etc. Typically, these tasks and interactions take place in an online environment, where the mobile device is connected to the Internet using cellular data or a Wi-Fi connection. Sometimes users interact with their mobile phones in an offline setting. This may be due to a lack of network coverage, or possibly, a desire to prevent private data from being widely shared over the Internet.

The processing of mobile services and interactions is usually maintained centrally by online service providers, which can establish the security and legitimacy of its services to its users. For example, payments made using a mobile payment application may typically rely on a centralized server for authorizing and/or validating transactions. When a mobile phone is offline, the availability of necessary services such as authorization of payments may be non-existent.

Additionally, when offline, the mobile phone may perform interactions with nearby local devices, such as other mobile phones. The mobile phone, since it is offline, cannot rely on a central server to determine if the interaction is fraudulent.

Embodiments of the invention address these and other problems individually and collectively.

BRIEF SUMMARY

Embodiments provide systems, apparatus, and methods for locally determining a data security value in an offline mesh network.

One embodiment of the invention includes a method comprising: determining, by a user device, prior to joining a mesh network comprising a plurality of user devices, a first data security value; communicating, by the user device, with the plurality of user devices to join the mesh network; receiving, by the user device, a plurality of additional data security values from a plurality of proximate user devices; determining, by the user device, an updated data security value based at least upon evaluating the plurality of additional data security values associated with the plurality of proximate user devices; and allowing or not allowing the user device to perform an interaction based at least upon the updated data security value.

Another embodiment of the invention includes a user device comprising: a processor; a memory device; and a computer-readable medium coupled to the processor, the computer-readable medium comprising code executable by the processor for implementing a method comprising: determining prior to joining a mesh network comprising a plurality of user devices, a first data security value; communicating with the plurality of user devices to join the mesh network; receiving a plurality of additional data security values from a plurality of proximate user devices; determining an updated data security value based at least upon evaluating the plurality of additional data security values associated with the plurality of proximate user devices; and allowing or not allowing the user device to perform an interaction based at least upon the updated data security value.

Another embodiment of the invention includes a method comprising: receiving, by a user device, a security request message from a first user device; broadcasting, by the user device, the security request message; receiving, by the user device, a plurality of data security values from proximate user devices that received the broadcasted security request message; determining, by the user device, a data security value based at least upon evaluating the plurality of data security values; and broadcasting, by the user device, the data security value, wherein the first user device receives the data security value.

Another embodiment of the invention includes a user device comprising: a processor; a memory device; and a computer-readable medium coupled to the processor, the computer-readable medium comprising code executable by the processor for implementing a method comprising: receiving a security request message from a first user device; broadcasting the security request message; receiving a plurality of data security values from proximate user devices that received the broadcasted security request message; determining a data security value based at least upon evaluating the plurality of data security values; and broadcasting the data security value, wherein the first user device receives the data security value.

Further details regarding embodiments of the invention can be found in the Detailed Description and the Figures.

BRIEF DESCRIPTION OF THE DRAWINGS

FIG. 4C shows a flow diagram illustrating a method of updating a data security value according to an embodiment of the invention.

FIG. 4D shows a flow diagram illustrating a method of updating a data security value according to an embodiment of the invention.

DETAILED DESCRIPTION

Figure 1:
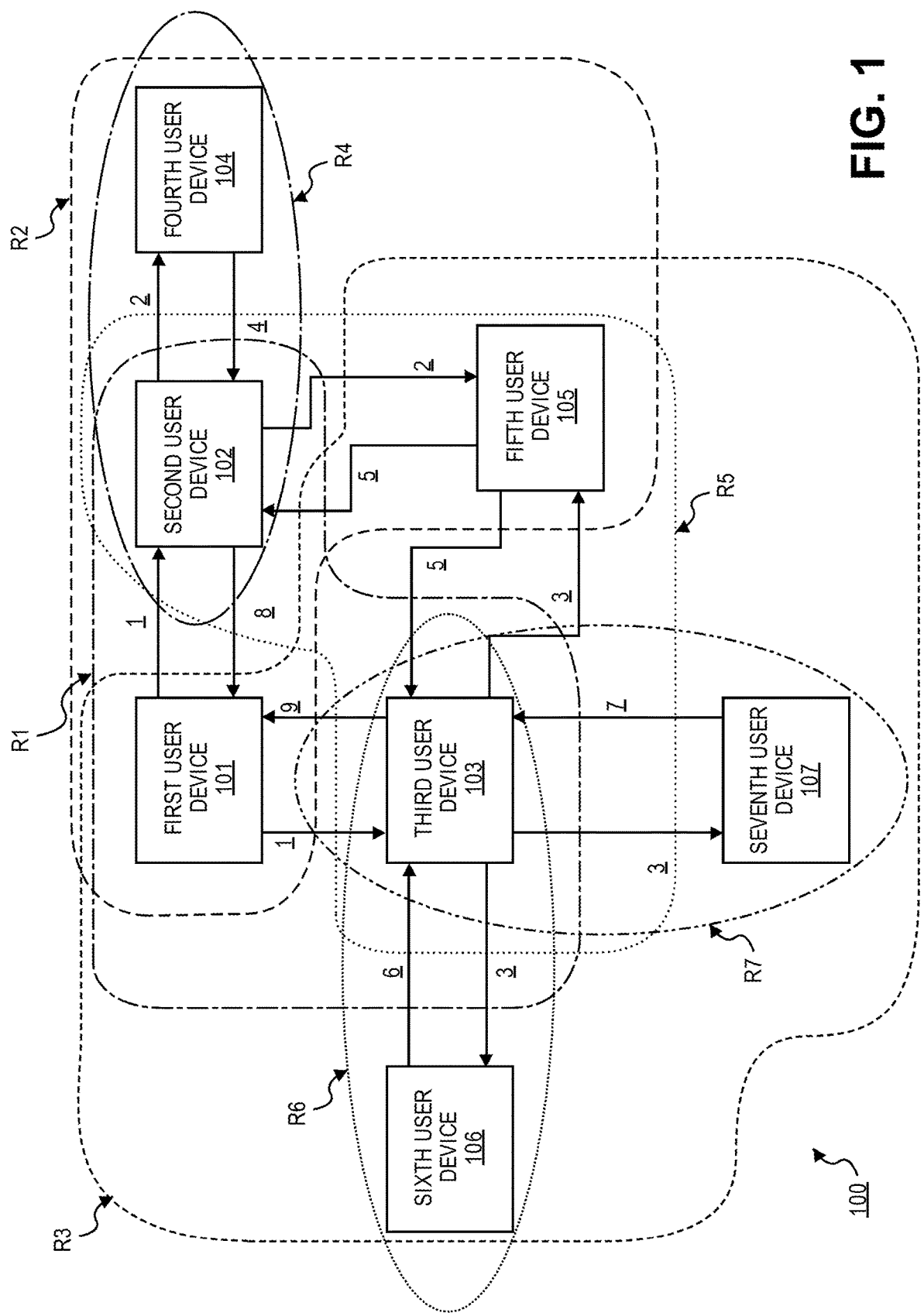
FIG. 1 shows a block diagram of a system illustrating a mesh network according to embodiments of the present invention.

Prior to discussing embodiments of the invention, some terms can be described in further detail.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

An "application" may be computer code or other data stored on a computer readable medium (e.g. memory element or secure element) that may be executable by a processor to complete a task.

A "risk model" may be a predictive model for determining the riskiness of current actions based on a history of previous actions. This may include comparing new data to old data that has been labeled as risky. Risk models used for the purpose of authenticating a user can also be referred to as "authentication models."

A "master authentication model" can be an authentication model that is used as a main authentication model for which other authentication models can reference or be updated with. For example, the master authentication model can be maintained by a service provider that provides updates to devices. In this manner, a master authentication model may be considered to be the most up to date or most accurate. A master authentication module can take into account data with respect to a large variety of users, devices, and circumstances.

A "local authentication model" can be an authentication model that exists on a user device. For example, the local authentication model can be a portion of a master authentication model or a master authentication model that has been reduced to a smaller file size. A location authentication model can include or be formed from data that is specifically associated with the user device, the circumstances (e.g., location) surrounding the user device, or the user and circumstances surrounding the user.

An "authentication result" can be a determination that something or someone is or is likely to be authentic. For example, an authentication result may be a decision that a user is genuinely who he or she says he or she is. For example, an authentication result can be positive if a user's identity is confirmed, while an authentication result can be negative if a user cannot be correctly identified.

The term "online" may refer to a state in which a device is connected over interconnected networks, such as through the Internet. In such a manner, the device is able to receive and send data globally across connections. The term "offline" may refer to any state in which a device is not online. For example, a device that is offline may communicate locally (e.g., via Bluetooth) but not globally (e.g., via Wi-Fi).

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network, and local communication to a mesh network. In such instances, the user device can be referred to as a "communication device." Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "mesh network" may be an array of nodes. Nodes in a mesh network may connect and communicate to one another. In some embodiments, the nodes in a mesh network may cooperate with one another to efficiently route data to and from particular nodes in the mesh network. The nodes in a mesh network may be user devices that may communicate with one another via local communication capabilities.

An "interaction" may be a reciprocal action that involves more than one actor. An interaction between devices can include the exchange of data. As an example, interactions between consumers and merchants can be transactions. An interaction may be a communication, contact, or exchange between parties, devices and/or entities. The interactions can also be, for example, the transfer of contact information, image files, video files, music files, documents, digital currency, etc.

A "data security value" may be a data value that indicates a level of security. The data security value may be a data value that indicates a security level associated with performing a potential interaction. For example, a large data security value of a user device may indicate that performing an interaction with the user device in the current mesh network may be potentially fraudulent. In some embodiments, a large data security value may be said to indicate risky interactions, whereas a small data security value may be said to indicate non-risky interactions. Data security values can be of any suitable type or magnitude. A data security value may be in the form of numbers or letters.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A user device may be in a "broadcast mode." A user device in the broadcast mode may broadcast data. For example, a user device may broadcast a security request message. In broadcast mode, a user device may broadcast any suitable data and/or information.

A user device may be in an "observe mode." A user device in observe mode may receive data. For example, a user device in observe mode may receive a security request message. In observe mode, a user device may receive any suitable data and/or information. A user device may alternate between broadcast mode and observe mode. In some embodiments, a broadcast mode and an observe mode may both be active on a user device at the same time, but may operate at different frequencies.

FIG. 1 shows a block diagram of a system 100 comprising a number of components according to some embodiments of the invention. The system comprises a first user device 101, a second user device 102, a third user device 103, a fourth user device 104, a fifth user device 105, a sixth user device 106, and a seventh user device 107. A mesh network may comprise the user devices 101-107.

Each user device may have a communication range. For example, the first user device 101 may have a communication range of 20 feet. The communication range may be any suitable length. In FIG. 1, the first user device 101 may have a communication range that encompasses the second user device 102 and the third user device 103. The second user device 102 may have a communication range that encompasses the first user device 101, the fourth user device 104, and the fifth user device 105. The third user device 103 may have a communication range that encompasses the fifth user device 105, the sixth user device 106, and the seventh user device 107. The fourth user device 104 may have a communication range that encompasses the second user device 102. The fifth user device 105 may have a communication range that encompasses the second user device 102 and the third user device 103. The sixth user device 106 may have a communication range that encompasses the third user device 103. The seventh user device 107 may have a communication range that encompasses the third user device 103. This arrangement of user devices may be used as an example, however, it is understood that any arrangement of user devices may be used. For example, the first user device 101 may have a communication range that encompasses four other user devices. In some embodiments, each user device may have a different communication range. For example, the first user device 101 may have a communication range of 5 feet and the seventh user device 107 may have a communication range of 13 feet.

In some embodiments, the user devices can change location. For example, a first user associated with the first user device 101 may physically move, thus changing the location of the first user device 101. The user devices may move into or out of communication range of other user devices. In some embodiments, user devices may join or leave the mesh network.

In some embodiments, users may be capable of interacting and transferring data between user devices locally in an offline manner. For example, a first user may use a local area network or a Bluetooth™ capability of the first user device 101 to interact with a second user and exchange data with the second user device 102. The interactions can be, for example, the transfer of contact information, image files, video files, music files, documents, digital currency, etc. For example, an interaction may involve the first user device 101 transferring cryptocurrency stored/maintained at an application of the first user device 101 to the second user device 102, such that the second user device 102 may access the cryptocurrency through a similar application stored at the second user device 102 and use the associated funds to conduct purchases thereafter.

For simplicity of illustration, a certain number of components are shown in FIG. 1. It is understood, however, that embodiments of the invention may include more than one of each component. For example, there may be an eighth user device that may have a communication range that encompasses the fifth user device 105 and the seventh user device 107.

Figure 2:
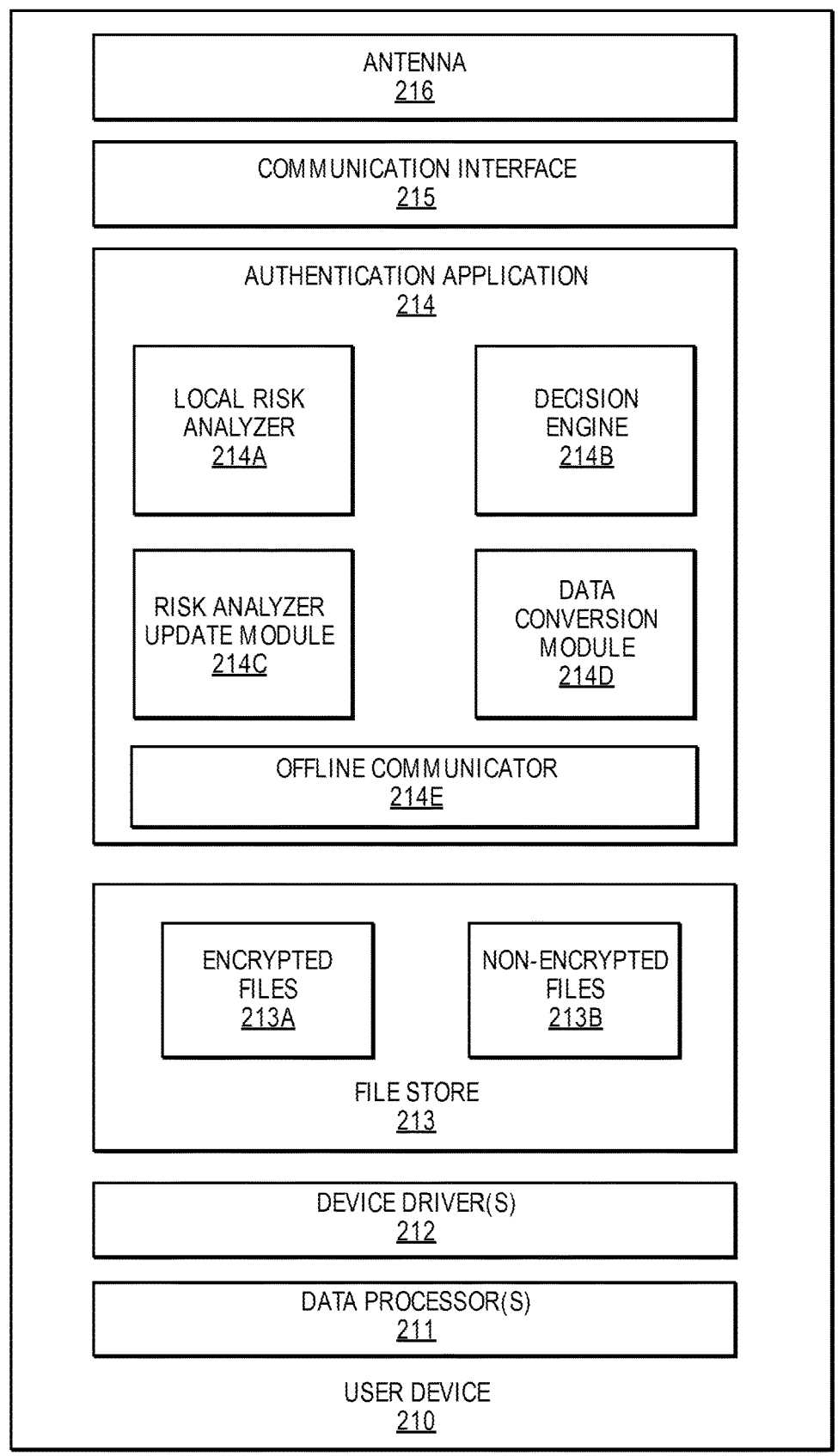
FIG. 2 shows a block diagram illustrating a user device according to an embodiment of the invention.

FIG. 2 shows a block diagram of an exemplary user device according to an embodiment of the invention. A user device 210 can be any suitable computing device, such as a mobile device, wearable device, personal computer, and/or Internet of things (IOT) device. An exemplary user device can include the first user device 101, the second user device 102, the third user device 103, and/or any of the other user devices shown in FIG. 1.

The user device 210 may comprise a data processor(s) 211 for processing electronic instructions as information. For example, the data processor can include any number of central processing units (CPUs) and/or graphics processing units (GPUs). The data processor(s) 211 may be configured to execute instructions stored in a computer-readable medium, such as from an internal and/or external memory.

The user device 210 may additionally comprise device driver(s) 212. The device driver(s) 212 may include software for translating data messages into a form that hardware elements coupled to user device 210 can understand. For example, the device driver(s) 212 may interpret input/output instructions of an operating system of the user device 210 as tasks that can be performed by a screen and/or camera of the user device 210, such as enabling the camera to take a picture and display it to a user of the user device 210.

The user device 210 may further comprise a file store 213. The file store 213 may comprise a portion of memory in which device data can be stored. The file store 213 may include encrypted files 213A and non-encrypted files 213B. For example, the file store 213 may comprise a store of encrypted messages and passwords for the user of the user device 210 as well as a non-encrypted cache of device operational data such as memory usage, CPU usage, application install/uninstall history, etc.

The user device 210 may also comprise an authentication application 214. The authentication application 214 can include software stored in a memory of the user device 210 that allows for secure authentication and authorization of device operations and interactions. The authentication application 214 may comprise a number of modules including a local risk analyzer 214A, a decision engine 214B, a risk analyzer update module 214C, a data conversion module 214D, and an offline communicator 214E.

The local risk analyzer 214A may comprise computer-readable instructions for analyzing device data and applying the data to a locally stored risk model. In one embodiment, the local risk analyzer 214A may comprise instructions for detecting one or more anomalies associated with an interaction. The local risk analyzer 214A (e.g., in conjunction with the data processor(s) 211) may compare collected device information to an event history and/or a cache history of recorded command sequences. For example, the local risk analyzer 214A may determine that a request is associated with an abnormally high rate of CPU usage, memory usage, or other device behavior that may deviate from values expected based on previously recorded data. Other examples of collected device information from which an anomaly can be observed from may include a device location, a history of connected devices, network connection history, a last update timestamp, activity since the last update, a last device reboot timestamp, and/or a last device recharge timestamp. In some embodiments, the local risk analyzer 214A may determine a data security value based on a plurality of received data security values.

The detection of an anomaly may initiate a risk analysis process for determining a risk score for an interaction. For example, an interaction relating to a data transfer of a music file to the user device 210 from an unknown device may involve an unknown device that has not received the latest software update for conducting interactions. The absence of the latest update on the unknown device may trigger the local risk analyzer 214A to initiate the risk analysis process, which may comprise applying information for the data transfer to a locally stored learning model that is trained for identifying potential computer viruses. The learning model may obtain and analyze the information for the data transfer (e.g. file size, device location, etc.) and may then determine a risk score quantifying the probability that the music file is actually a malicious program.

The decision engine 214B may comprise instructions for evaluating incoming data and determining an appropriate response and/or action. In one embodiment, the decision engine 214B may comprise a behavior tree. The behavior tree may include various actions that can be queried based on the analyzed risk of incoming data. For example, the behavior tree may comprise an action of 'restrict offline access' for interaction data that has received a risk score of 90 or higher (i.e. high risk interaction). In some embodiments, the decision engine 214B may comprise other types of machine learning software based on, for example, k-means, SVM classification, decision trees, neural networks, and any other suitable machine learning techniques.

The risk analyzer update module 214C may comprise instructions for synchronizing a local risk model with information of a master authentication model maintained by a remote authentication system. The master authentication model may comprise new information relating to recent data that has been collected from other devices in a network, and the new information may allow for more accurate risk modeling and identification of fraud. For example, the user device 210 may lose network coverage during a period of time in which a fraudulent actor has interacted frequently in the network. Fraudulent activity performed by the actor may be logged and identified by the remote authentication system and expressed in the master authentication model so that the master authentication model is up to date. When the user device 210 regains network connectivity, the local risk model may be updated to account for the recent fraudulent activity. The risk analyzer update module 214C may perform updates when the user device 210 is online.

The user device 210 may comprise a processor, and a computer readable medium coupled to the processor. The computer readable medium may comprise code, executable by the processor to implement a method comprising: determining, by a user device, prior to joining a mesh network comprising a plurality of user devices, a first data security value; communicating, by the user device, with the plurality of user devices to join the mesh network; receiving, by the user device, a plurality of additional data security values from a plurality of proximate user devices; determining, by the user device, an updated data security value based at least upon evaluating the plurality of additional data security values associated with the plurality of proximate user devices; and allowing or not allowing the user device to perform an interaction based at least upon the updated data security value.

In some embodiments, the computer readable medium may comprise code, executable by the processor to implement a method comprising: receiving, by a user device, a security request message from a first user device; broadcasting, by the user device, the security request message; receiving, by the user device, a plurality of data security values from proximate user devices that received the broadcasted security request message; determining, by the user device, a data security value based at least upon evaluating the plurality of data security values; and broadcasting, by the user device, the data security value, wherein the first user device receives the data security value.

The data conversion module 214D may comprise instructions for converting data values into a different form. In one embodiment, the data conversion module 214D may comprise instructions for performing a data encryption method. For example, the data conversion module 214D may comprise instructions for encrypting device information in a manner that allows for secure multi-party computation, such as obfuscating clear text values according to Yao's garbled circuit or other suitable garbled circuit protocol.

The offline communicator 214E may comprise instructions for receiving offline requests and delivering offline responses between interacting devices. For example, the offline communicator 214E may comprise code for generating Bluetooth™ messages (e.g., classic and BLE—Bluetooth™ Low Energy) and broadcasting Bluetooth™ messages to nearby devices. The offline communicator 214E may comprise instructions for exchanging data through any suitable offline communication means, such as through near-field communications, radio-frequency identification (RFID), SS7 signaling, etc.

Furthermore, the user device 210 may comprise a communication interface(s) 215 for formatting and reformatting data messages. As such, the user device 210 may be capable of sending and receiving messages properly and successfully during an interaction and/or software update. For example, the communication interface(s) 215 may comprise instructions for formatting an SMS text message or Internet protocol message that can be sent over an antenna 216. As another example, the communication interface(s) 215 may include instructions for pairing the user device 210 with one or more nearby devices over Bluetooth.

The user device 210 may comprise the antenna 216 for sending and receiving data messages wirelessly. For example, the antenna 216 may be cellular antenna for connecting to a telecommunications network. The antenna 216 may be capable of sending and receiving data coverage by any available means, such as through 3G, 4G, 5G, LTE, Wi-Fi, etc. In some embodiments, the antenna 216 may be used during online communications.

According to embodiments, the user device 210 may be capable of conducting interactions, such as payment transactions and other data transfers. These interactions can be authorized online or offline, and may initiate an online or offline authentication process for identifying the user of the device and verifying his or her credentials. For example, authentication may comprise verifying usernames, passwords, payment credentials as well as conducting appropriate risk scoring for identifying and preventing fraud.

Figure 3:
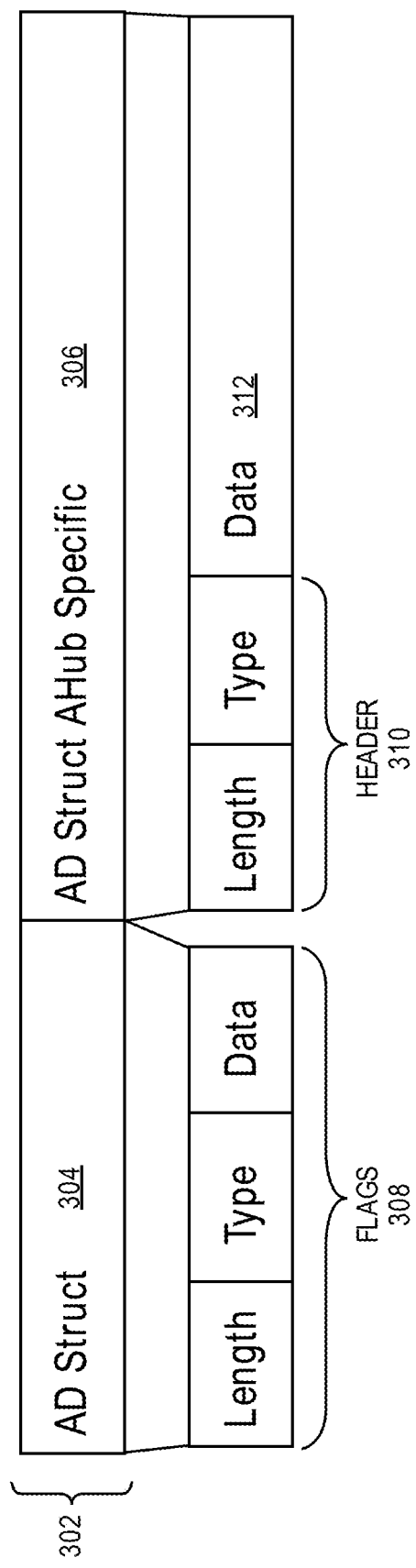
FIG. 3 shows a block diagram of an example broadcast message according to an embodiment of the invention.

FIG. 3 shows a block diagram of an example broadcast message according to an embodiment of the invention. FIG. 3 includes a broadcast message 302, also referred to as an advertisement. The broadcast message may include an advertisement structure 304 and a specific advertisement structure 306. In some embodiments, the security request message may be a broadcast message.

The advertisement structure 304 may include flags 308. The advertisement structure 304 may be included in all broadcast messages. The flags 308 may include, for example, a length, a type, and data.

The flags 308 may be a predefined bit or sequence of bits that hold a binary value. In some embodiments, the flags 308 may allow a user device to indicate information to user devices that receive the broadcast message. For example, a broadcast message broadcast by a first user device may include flags indicating the length of the broadcast message, the type of broadcast message, and the data included in the broadcast message.

The specific advertisement structure 306 may include a header 310 comprising a length and a type as well as data 312. The specific advertisement structure 306 may vary between different mesh networks. For example, different mesh networks may include different data 312 depending on the configuration and features of the mesh network. The header 310 may allow a user device to quickly determine information regarding the broadcast message without having to analyze the full data 312. For example, the header 310 may include a type which may indicate that the broadcast message is a security request message. In other embodiments, the type may indicate that the broadcast message is another type of message, for example, a security response message. The header 310 may also include a length, for example, a length indicating that the data is 20 MB. The data 312 may include a data security value. In some embodiments, the data 312 may include a timestamp of when the broadcast message was broadcast. The data 312 may also include a message identifier or ID. The message identifier may be used to track the message as it travels through the mesh network. The message identifier can also be included in any response messages so that responses messages can be identified as being relevant to certain request messages.

In some embodiments, the entrance of the first user device 101 into the mesh network may be recorded. For example, the entrance of the first user device 101 into the mesh network may be recorded in a log that is included in the data 312. The second user device 102 and the third user device 103 may update the user device log and may then both broadcast the updated user device log. The updated user device log may be received by any user devices of the plurality of user devices within communication range of the second user device 102 and the third user device 103. In this way, the plurality of user devices of the mesh network may determine the user devices connected to the mesh network.

In some embodiments, additional data may be included in the data 312. For example, the additional data may be a number of user devices in the mesh network, a geographic location of the first user device 101, a geographic location of the mesh network, a history of interactions in the mesh network, a time since the last time that the first user device 101 was online, a proximity to a Wi-Fi network, a plurality of timestamps associated with when the user devices of the plurality of user devices were last recharged, etc. This data may be included in the data 312 of each broadcast message. These examples of additional data are described in further detail below.

The user devices in the network may share prior offline experiences of other devices to enable risk analysis across the whole offline network. Each user device can return an average of risk (i.e., Risk (j)=sum(Risk Device for all j in Nj)/Count Device Nj). Each user device may reveal if it is sociable or not to the other user devices. In some embodiments, the sociability of the user device may be a Boolean value. For example, the sociability may be a 1 or a 0, which may relate to social or antisocial, respectively. A social device may be capable of performing interactions with other social devices. An antisocial device may not be capable of performing interactions with social or antisocial devices.

A user device can become antisocial in the following ways. For example, the first way a user device may become antisocial may be through user settings. The user of the user device may select a setting on the user device which sets the user device to be antisocial. In some embodiments, the user may select the antisocial setting via a button, or other suitable input. In other embodiments, any suitable method for selecting a setting may be used. For example, the user of the user device may enter a train station and may know that malicious parties operate in the mesh network associated with the train station. The user of the user device may set the user device to be antisocial. In this way, the user's knowledge of malicious parties may affect the mesh network since the user device is set to antisocial.

The user device may also become antisocial if it is surrounded by risky devices. For example, if the user device determines that it is in communication range of more risky user devices than a predetermined threshold, then the user device may decide to become antisocial. The user device may decide to become antisocial based on the data security value. The user device may compare the data security value to a risk score threshold. For example, the risk score threshold may be a value of 10, if the user device determines that the updated data security value is equal to a value of 14, then the user device may decide to become antisocial.

Another way that the user device may become antisocial is when a device risk threshold has been exceeded. The user device may be associated with a device risk threshold. In some embodiments, the device risk threshold may be predetermined an may be unique to each user device. For example, the user device may have a device risk threshold equal to 10. The device risk threshold may be any suitable value. If the user device determines that malware, or other malicious code, has been installed or that there is a chance that malware has been installed onto the user device, the user device may determine a device risk value. If the device risk value exceeds the device risk threshold, then the user device may decide to become antisocial. For example, the user device may detect high CPU usage from an application that is not verified by a trusted third party. The user device may determine that the application has a high probability of being malicious. The user device may then decide to become antisocial.

Yet another way that the user device may become antisocial is that the plurality of user devices in the mesh network may have exceeded a predefined weighted number of offline interactions or actions predefined in a white list or behavior tree. For example, the user device may be located in a public marketplace. The public marketplace may be associated with a predefined number of weighted offline interactions such as 100 per day. The user device may decide to become antisocial if the weighted number of offline interactions exceeds the predefined number of weighted offline interactions. In some embodiments, the predefined number of weighted offline interactions may be any suitable value and may be associated with any suitable location. The weighted number of offline interactions may increase by an amount every time a transaction occurs. For example, a first user device may perform a transaction with a second user device. After the transaction has taken place, the weighted number of offline interactions may increase by one. In some embodiments, the weighted number of offline interactions may increase by any suitable amount. In other embodiments, the weighted number of offline interactions may increase more when performing a riskier transaction as compared to performing a less risky transaction. The weighted number of offline interactions may increase by an amount that is based on the data security value computed by the user device. For example, a first user device may compute the data security value of 4. The first user device may then perform a transaction with a second user device. After the transaction has completed, the weighted number of offline interactions may increase by a value equal to the data security value of 4.

As the user devices conduct more interactions, the average of the data security values rises and more devices can become antisocial. As more devices become antisocial, the activity in the network can decrease. Risky behavior may infect the mesh network, increasing the data security values of each user device.

In some embodiments, the plurality of user devices in the mesh network may generate and update a record of sociable devices. For example, a first user device may switch from social to antisocial. The other user devices may update the record of sociable devices to indicate that the first device became antisocial. In some embodiments, the record may include a device identifier and a sociability indicator. The device identifier may identify the device. The device indicator may be unique for each user device. The device indicator may be any suitable sequence of alphanumeric characters. The sociability indicator may indicate sociability and may be a Boolean value. In some embodiments, the sociability indicator and the device indicator may both be included in the data 312 of each broadcast message.

FIG. 1 shows a flow diagram illustrating a message propagation method according to an embodiment of the invention. Although the steps are illustrated in a specific order, it is understood that embodiments of the invention may include methods that have the steps in different orders. In addition, steps may be omitted or added and may still be within embodiments of the invention. The user devices may each have a communication range as described above.

Before step 1, the first user device 101 may determine a first data security SV1 value prior to joining a mesh network comprising a plurality of user devices. In some embodiments, the first user device 101 may determine the first data security value SV1 based on a previously stored data security value. For example, the first user device 101 may have stored a data security value previously when leaving a mesh network. The first user device 101 may determine to set the first data security value SV1 equal to the previously stored data security value. The first data security value SV1 may be a risk score that may indicate the amount of risk associated with performing an interaction with a user device of the plurality of user devices. In some embodiments, the data security value may be a value (e.g., 3, 8, 20, etc.), wherein a larger value may indicate a larger risk of performing a fraudulent data security interaction if an interaction is performed within the mesh network.

In some embodiments, the first user device 101 may also determine whether to be social or antisocial based on the first data security value. If the first user device 101 has stored information regarding high levels of fraudulent interactions in a mesh network, the first user device 101 may decide to be antisocial prior to joining the mesh network.

In some embodiments, the first user device 101 may determine the same first data security value SV1 (e.g., 1) each time the first user device 101 joins a mesh network. For example, the first user device 101 may set the first data security value SV1 to be 1 when the first user device 101 joins a first mesh network. The first user device 101 may then leave the first mesh network and may join a second mesh network. Prior to joining the second mesh network, the first user device 101 may determine the first data security value SV1 to be 1.

In other embodiments, the first user device 101 may determine the first data security value SV1 based on the location of the mesh network. For example, the first user device 101 may determine a first data security value SV1 of 2 when joining a mesh network located in a grocery store and may determine a first data security value SV1 of 7 when joining a mesh network located in a busy gas station. In some embodiments, the first user device 101 may use its GPS locator to determine a geographic coordinate of the first user device 101. The first user device 101 may then determine a location (e.g., gas station) associated with the geographic coordinate. The first user device 101 may store information regarding locations associated with the geographic coordinate. In some embodiments, frequently visited geographic coordinates and associated locations may be stored in the first user device 101.

In some embodiments, the first user device 101 may determine the first data security value SV1 based on stored data regarding that location. For example, the first user device 101 may have previously joined a mesh network at the grocery store and may have left the grocery store with a data security value of 10. Upon joining the mesh network again, the first user device 101 may determine the first data security value SV1 to be a 10. In some embodiments, the first user device 101 may determine the first data security value SV1 based on a local authentication model stored on the first user device 101.

After determining the first data security value SV1, the first user device 101 may communicate with the plurality of user devices to join the mesh network. At step 1, the first user device 101 may initiate communication with a plurality of mobile devices in a mesh network. The first user device 101 may then broadcast a security request message. The security request message may be a broadcast message, as described above. The security request message may include a request for the user devices of the plurality of user devices to respond with additional data security values. The additional data security values may be data security values determined by the plurality of user devices.

The security request message may be received by the user devices within communication range of the first user device 101. The second user device 102 and the third user device 103 may be in communication range R1 of the first user device 101. The second user device 102 and the third user device 103 may both receive the security request message.

At step 2, after receiving the security request message from the first user device 101, the second user device 102 may broadcast the security request message to user devices within its communication range R2. In some embodiments, the second user device 102 may determine whether to broadcast the security request message or to respond to the first user device 101 based on the flags 308 included in the security request message. For example, the flags 308 may be a 0, which may indicate to broadcast the security request message, or may be a 1, which may indicate to respond to the security request message. The security request message may be received by the user devices within communication range of the second user device 102. For example, the fourth user device 104 may receive the security request message and the fifth user device 105 may receive the security request message.

For example, the first user device 101, the fourth user device 104, and the fifth user device 105 may be within range R2 of the second user device 102. The first user device 101 can recognize that the broadcast message, by the second user device 102, is the same as the one the first user device 101 broadcasted to the second user device 102 and may not process the received message.

At step 3, after receiving the security request message from the first user device 101, the third user device 103 may broadcast the security request message. The security request message that the third user device 103 broadcasts may be the same security request message that the third user device 103 receives. In some embodiments, the third user device 103 may broadcast the security request message to a plurality of user devices within its vicinity. The security request message may be received by the user devices within communication range R3 of the third user device 103. The first user device 101, the fifth user device 105, the sixth user device 106, and the seventh user device 107 may receive the security request message.

In some embodiments, steps 2 and 3 may occur in parallel and may not be conditionally dependent on one another.

At step 4, after receiving the security request message from the second user device 102, the fourth user device 104 may determine to respond to the security request message and can broadcast a fourth data security value SV4. The fourth data security value SV4 may be a data security value previously determined by the fourth user device 104. In some embodiments, the fourth user device 104 may have previously broadcast a security request message and received a plurality of data security values in order to determine the fourth data security value SV4. After the fourth user device 104 broadcasts the fourth data security value SV4, the fourth data security value SV4 may be received by the user devices within communication range R4 of the fourth user device 104, such as the second user device 102. In some embodiments, the fourth user device 104 may determine that it wants to respond to the second user device 102 with a data security value.

At step 5, after receiving the security request message from the second user device 102 and the third user device 103, the fifth user device 105 may broadcast a fifth data security value SV5. The fifth data security value SV5 may be a data security value previously determined by the fifth user device 105. The fifth data security value SV5 may be received by the user devices within communication range R5 of the fifth user device 105. The second user device 102 and the third user device 103 may receive the fifth data security value SV5.

In some embodiments, the fifth user device 105 may receive the security request message from the third user device 103 before receiving the security request message from the second user device 102. The fifth user device 105 may broadcast the fifth data security value SV5 after receiving the security request message from one of the user devices but before receiving the security request message from another user device. The fifth user device 105 may broadcast the same fifth data security value SV5 irrespective of which device it received the security request message from. In other embodiments, the fifth user device 105 may respond to both the second user device 102 and the third user device 103.

At step 6, after receiving the security request message from the third user device 103, the sixth user device 106 may broadcast a sixth data security value SV6. The sixth data security value SV6 may be a data security value previously determined by the sixth user device 106. The sixth data security value SV6 may be received by the user devices within communication range R6 of the sixth user device 106. The third user device 103 may receive the sixth data security value SV6.

At step 7, after receiving the security request message from the third user device 103, the seventh user device 107 may broadcast a seventh data security value SV7. The seventh data security value SV7 may be a data security value previously determined by the seventh user device 107. The seventh data security value SV7 may be received by the user devices within communication range of the seventh user device 107. The third user device 103 may receive the seventh data security value SV7.

In some embodiments, steps 4-7 may occur in parallel and may not be conditionally dependent on one another.

At step 8, after receiving the fourth data security value SV4 from the fourth user device 104 and receiving the fifth data security value SV5 from the fifth user device 105, the second user device 102 may determine an updated second data security value USV2 based on the fourth data security value SV4, the fifth data security value SV5, and a second data security value SV2. The second data security value SV2 may be a data security value previously determined by the second user device 102. For example, in some embodiments, the updated second data security value USV2 may be an average of the fourth data security value SV4, the fifth data security value SV5, and the second data security value SV2. The second user device 102 may store the updated second data security value USV2 and may use the updated second data security value USV2, rather than the second data security value SV2, for processing thereafter.

After determining the updated second data security value USV2, the second user device 102, may broadcast the updated second data security value USV2. The updated second data security value USV2 may be received by the user devices within communication range of the second user device 102. The first user device 101 may receive the updated second data security value USV2. In some embodiments, the header 310 or the flags 308 of the broadcast message may indicate the intended recipient of the broadcast, in this case, the first user device 101.

At step 9, after receiving the fifth data security value SV5 from the fifth user device 105, receiving the sixth data security value SV6 from the sixth user device 106, and receiving the seventh data security value SV7 from the seventh user device 107, the third user device 103 may determine an updated third data security value USV3 based on the fifth data security value SV5, the sixth data security value SV6, the seventh data security value SV7, and a third data security value SV3. The third data security value SV3 may be a data security value previously determined by the third user device 103. After determining the updated third data security value USV3, the third user device 103 may broadcast the updated third data security value USV3. The updated third data security value USV3 may be received by the user devices within communication range of the third user device 103. The first user device 101 may receive the updated third data security value USV3.

The first user device 101 may receive a plurality of additional data security values from a plurality of proximate user devices (i.e., the second user device 102 and the third user device 103). The plurality of additional data security values may include the updated second data security value USV2 and the updated third data security value USV3.

After receiving the plurality of additional data security values from the plurality of proximate user devices, the first user device 101 may determine an updated data security value USV1 based at least upon evaluating the plurality of additional data security values associated with the plurality of proximate user devices. In some embodiments, the updated data security value USV1 may be determined to be an average of the plurality of additional data security values and the first data security value SV1. In some embodiments, determining the updated data security value USV1 may be based on additional data. In some embodiments, the additional data may be stored in a local authentication model on each user device and/or the data 312 of the broadcast message. For example, the additional data may be a number of user devices in the mesh network, a geographic location of the first user device 101, a geographic location of the mesh network, a history of interactions in the mesh network, a time since the last time that the first user device 101 was online, a proximity to a Wi-Fi network, a plurality of timestamps associated with when the user devices of the plurality of user devices were last recharged, etc. This data may be included in the data 312 of each broadcast message. These examples of additional data are described below.

For example, the first user device 101 may determine the number of user devices in the mesh network using a counter in the messages. The broadcast message can include a counter that may be increased by one by a user device when the user device broadcasts the message. In some embodiments, the first user device 101 may receive multiple messages, in which case, the first user device 101 may determine a sum of the counter in each of the received messages to determine the number of user devices in the mesh network.

The number of user devices in the mesh network may be used to determine the updated data security value USV1. For example, the first user device 101 with a first data security value SV1 of 3 may receive the plurality of additional data security values of 5, 8, and 2. The first user device 101 may then weight the average of the data security values by the number of user devices in the mesh network (e.g., 100). As an example, the updated data security value USV1 may be determined to be $$\frac{(5+8+2+3)}{4} \times \frac{\sqrt{100}}{4} = 11.25.$$

It is understood that different ways to weight the average of the data security values by the number of user devices in the mesh may be used.

The geographic location of the first user device 101 may also be used to determine the updated data security value USV1. For example, the geographic location of the first user device 101 may be associated with a grocery store or a pub. Different locations may be associated with different risk levels. The first user device 101 may weigh the updated data security value USV1 with the geographic location of the first user device 101. For example, the grocery store may have a lower risk level than the pub, therefore the first user device 101 may weigh the updated data security value USV1 by a higher value at the pub than at the grocery store. In some embodiments, the amount to weight the updated data security value USV1 may be stored in the first user device 101. The geographic location of the mesh network may be used to determine the updated data security value USV1 as described above for the geographic location of the first user device 101. Additionally, the geographic location of the first user device 101 and/or the mesh network may be on a larger scale than a building. For example, the city of San Francisco may be associated with a different risk level than the city of Detroit.

The history of interactions in the mesh network may also be used to determine the updated data security value USV1. The history of interactions in the mesh network may be a log and may include successful and risky interactions. For example, the history of interactions log may include 5 interactions that occurred earlier in the day, 4 of the interactions may be successful, and 1 may be fraudulent. The first user device 101 may determine the updated data security value USV1 that is higher when more of the previous interactions were fraudulent. For example, if all of the previous interactions in a mesh network were fraudulent, then the first user device 101 may determine a high updated data security value USV1 and may also decide to become antisocial.

The time since the last time that the first user device 101 was online may be used to determine the updated data security value USV1. The longer it has been since the last time that the first user device 101 the higher the updated data security value USV1 may be determined. For example, if the first user device 101 was online, has only been offline for 1 day, then the updated data security value USV1 may be determined to be lower than if the first user device 101 has been offline for 8 months.

The proximity to a Wi-Fi network may be used to determine the updated data security value USV1. For example, the first user device 101 may have stored information regarding the locations of known Wi-Fi networks. In some embodiments, the first user device 101 may use its GPS locator to determine a geographic coordinate of the first user device. The first user device 101 may then determine if there is stored information regarding the location of a known Wi-Fi network. The stored information regarding the locations of known Wi-Fi networks may have been previously downloaded from a server. The locations of known Wi-Fi networks may also include the locations of Wi-Fi networks that the first user device 101 previously connected to. For example, If the first user device 101 is near a known Wi-Fi network, the first user device 101 may determine a high updated data security value USV1 and may prompt the user to perform interactions within the nearby Wi-Fi network.

In some embodiments, the broadcasted messages may include data related to a timestamp of when the user devices of the plurality of user devices were last recharged. For example, each user device may add its timestamp to the broadcast message when the user device broadcasts the message. The plurality of timestamps associated with when the user devices of the plurality of user devices were last recharged may be used to determine the updated data security value USV1. For example, if a user device has not been completely recharged in the last few days it may be a fraudulent user device. The first user device 101 may determine if a user device is a potentially fraudulent user device based on the received timestamps of when the user devices of the plurality of user devices were last recharged.

After determining the updated data security value USV1, the first user device 101 may allow or not allow the first user device 101 to perform an interaction based at least upon the updated data security value USV1.

In some embodiments, the security request message may be transmitted to any suitable number of user devices of the plurality of user devices. For example, there may be 20 user devices in the mesh network. The security request message may be propagated by the plurality of user devices to reach the 20 user devices.

In other embodiments, the security request message may be broadcasted to and received by a predetermined number of devices. For example, the security request message may be received by 10 of the 20 user devices. For example, the security request message may include a counter. The counter may start at an initial value at the originating device, and then decrease by one each time the security request message is received by different user device. Once the counter reaches zero, the plurality of user devices that received the security request message may broadcast the plurality of additional security data values. The broadcast and observe process described above may be used so that the first user device 101 may receive the plurality of additional security data values from the plurality of proximate user devices.

Additionally, the counter may allow for a certain number of layers of the mesh network to receive the security request message. This can be helpful to limit the propagation of the request message through the network such that the originating device can estimate when a response might be received. A layer may include the user devices within communication range of the broadcasting user device. The counter can be a number stored in the security request message. For example, the second user device 102 and the third user device 103 may be in a first layer. The fourth user device 104, the fifth user device 105, the sixth user device 106, and the seventh user device 107 may be in a second layer. The counter may decrease each time the security request message is broadcast. For example, if the counter is equal to a value of two, the first user device 101 may broadcast the security request message, the first user device 101 can decrease the counter by one to be to be equal to one. The user devices that received the broadcasted security request message (i.e., user devices of the first layer) may then broadcast the security request message, thus decreasing the counter by one to be equal to zero. The security request message may then not be broadcast again since the counter is equal to a value of zero. After receiving the security request message, the user devices of the second layer may propagate the plurality of additional data security values back to the first user device 101, as described above.

In yet other embodiments, the security request message may only be transmitted to user devices within a certain geographic location. For example, the security request message may be transmitted to the plurality of user devices in the mesh network within 100 feet of the first user device 101. In another example, the security request message may be transmitted to the plurality of user devices within the same building as the first user device 101.

FIGS. 4A-4D show a flow diagram illustrating updating a data security value according to an embodiment of the invention. In this example, no user devices are malicious. Although the steps are illustrated in a specific order, it is understood that embodiments of the invention may include methods that have the steps in different orders. In addition, steps may be omitted or added and may still be within embodiments of the invention.

In FIGS. 4A-4D, the communication ranges of the devices may be as follows: the second user device 102 and the third user device 103 may be in broadcast range of the first user device 101. The fourth user device 104, the fifth user device 105, and the sixth user device 106 may be in broadcast range of the second user device 102. The sixth user device 106 and the seventh user device 107 may be in broadcast range of the third user device 103. The second user device 102 and the third user device 103 may be in a first layer 402. The fourth user device 104, the fifth user device 105, the sixth user device 106, and the seventh user device 107 may be in a second layer 404.

Before step S702, the first user device 101 may determine a first data security value SV1 equal to 1. The second user device 102 may have determined a second data security value SV2 equal to 3. The third user device 103 may have determined a third data security value SV3 equal to 2. The fourth user device 104 may have determined a fourth data security value SV4 equal to 7. The fifth user device 105 may have determined a fifth data security value SV5 equal to 6. The sixth user device 106 may have determined a sixth data security value SV6 equal to 2. The seventh user device 107 may have determined a seventh data security value SV7 equal to 2.

At step S702, the first user device 101 may broadcast a security request message. Since the second user device 102 and the third user device 103 are in broadcast range of the first user device 101, the second user device 102 and the third user device 103 may both receive the security request message. The security request message may include a request for the user devices of the plurality of user devices to respond with additional data security values. The additional data security values may be data security values determined by the plurality of user devices. In some embodiments, the security request message may include the additional data described above (i.e., counters, geographic location, etc.).

Figure 4A:
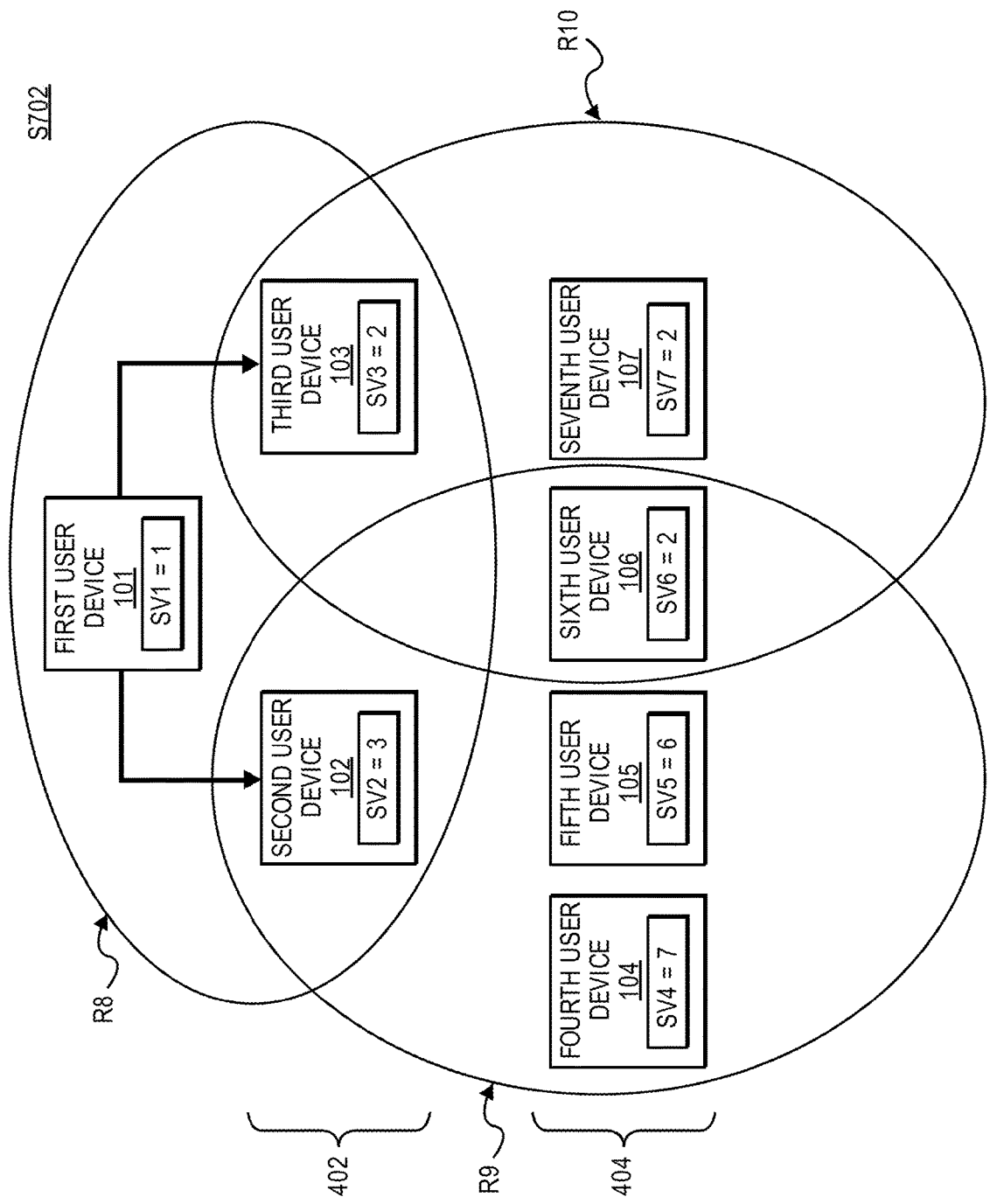
FIG. 4A shows a flow diagram illustrating a method of updating a data security value according to an embodiment of the invention.
Figure 4B:
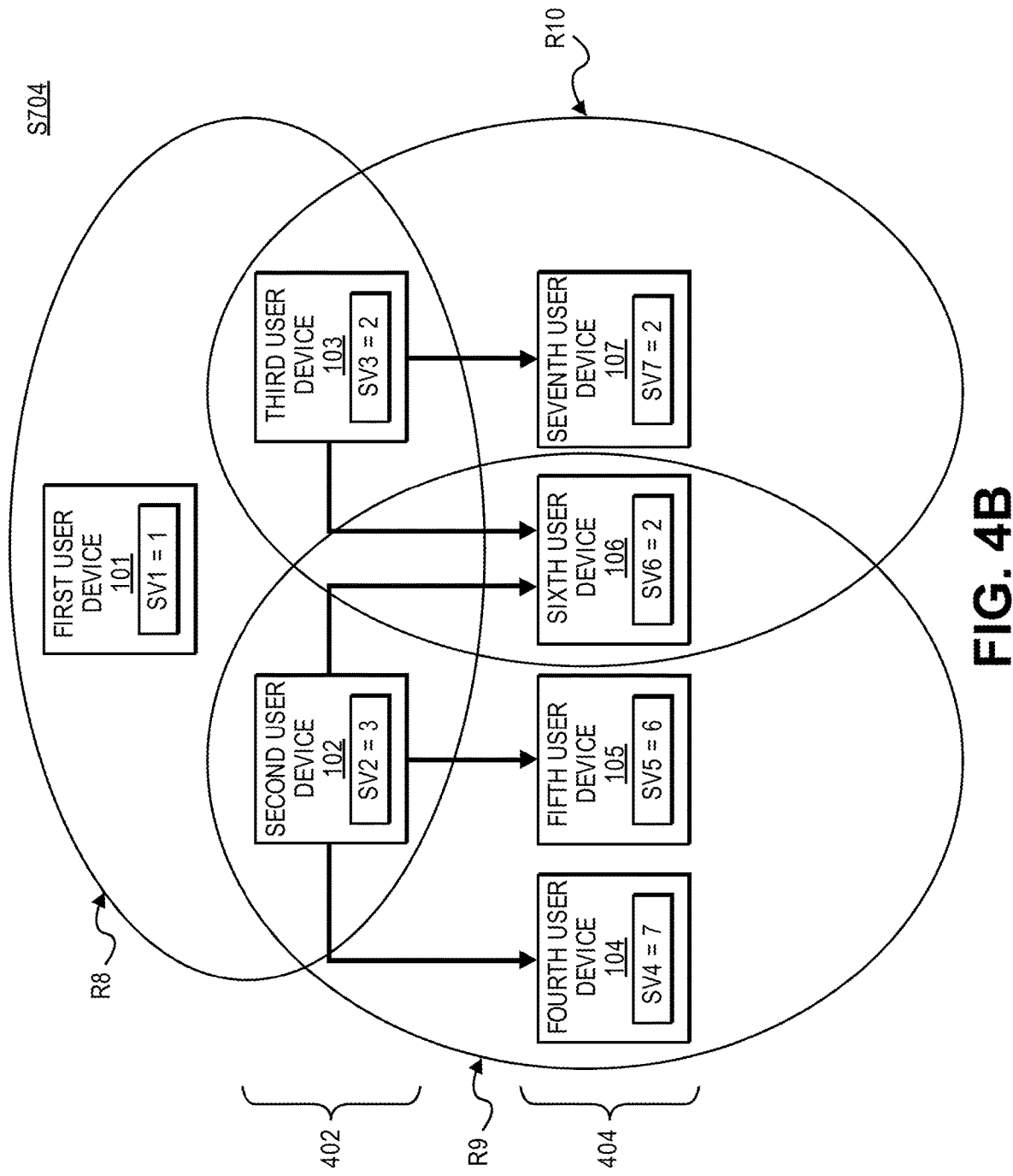
FIG. 4B shows a flow diagram illustrating a method of updating a data security value according to an embodiment of the invention.

The next step S704 is shown in FIG. 4B. At step S704, the second user device 102 may broadcast the security request message. The security request message may be the same security request message received from the first user device 101. Since the fourth user device 104, the fifth user device 105, and the sixth user device 106 are in broadcast range of the first user device 101, they may receive the security request message. Additionally, the third user device 103 may broadcast the security request message. The security request message may be the same security request message received from the first user device 101. Since the sixth user device 106 and the seventh user device 107 are in broadcast range of the third user device 103, the sixth user device 106 and the seventh user device 107 may receive the security request message. In some embodiments, a user device may broadcast the security request message that the user device receives.

In some embodiments, the first layer 402 may broadcast the security request message to the second layer 404 after receiving the security request message from the first user device 101.

The next step S706 is shown in FIG. 4C. At step S706, after receiving the security request message from the second user device 102, the fourth user device 104 may broadcast the fourth data security value SV4 which may be equal to 7. The fourth data security value SV4 may be determined prior to receiving the security request message. Since the second user device 102 is in broadcast range of the fourth user device 104, the second user device 102 may receive the fourth data security value SV4. Additionally, after receiving the security request message from the second user device 102, the fifth user device 105 may broadcast the fifth data security value SV5 which may be equal to 6. Since the second user device 102 is in broadcast range of the fifth user device 105, the second user device 102 may receive the fifth data security value SV5.

In some embodiments, the second layer 404 may broadcast data security values to the first layer 402 after receiving security request message from the first layer 402.

After receiving the security request message from the second user device 102, the sixth user device 106 may broadcast the sixth data security value. Since the second user device 102 and the third user device 103 are both in broadcast range of the sixth user device 106, both the second user device 102 and the third user device 103 may receive the sixth data security value. Additionally, after receiving the security request message from the second user device 102, the seventh user device 107 may broadcast the seventh data security value SV7 which may be equal to 2. Since the third user device 103 is in broadcast range of the seventh user device 107, the third user device 103 may receive the seventh data security value SV7.

After receiving the fourth data security value SV4, the fifth data security value SV5, and the sixth data security value SV6, the second user device 102 may determine an updated second data security value USV2. The second user device 102 may determine an updated second data security value USV2 based on the second data security value SV2, fourth data security value SV4, the fifth data security value SV5, and the sixth data security value SV6. For example, the updated second data security value USV2 may be equal to the average of the received data security values $$\left(\text{i.e.,}\ \frac{SV2+SV4+SV5+SV6}{4}\ \text{which may be}\ \frac{3+7+6+2}{4}=4.5\right).$$

The updated second data security value USV2 may be determined, in this case, to be 4.5. In some embodiments, the updated second data security value USV2 may be rounded to be an integer value (e.g., 5).

After receiving the sixth data security value SV6 and the seventh data security value SV7, the third user device 103 may determine an updated third data security value USV3. The updated third data security value USV3 may be determined in a manner similar to the above description of determining the updated second data security value USV2. For example, the third user device 103 may determine the updated third data security value USV3 to be equal to $$\frac{2+2+2}{3}=2.$$

In some embodiments, the second user device 102 and the third user device 103 may concurrently determine the updated second data security value USV2 and the updated third data security value USV3, respectively.

The next step S708 is shown in FIG. 4D. At step S708, the second user device 102 may broadcast the updated second data security value USV2. Since the first user device 101 is in broadcast range of the second user device 102, the first user device 101 may receive the updated second data security value USV2. Additionally, the third user device 103 may broadcast the updated third data security value USV3. Since the first user device 101 is in broadcast range of the third device, the first user device 101 may receive the updated third data security value USV3.

After receiving a plurality of additional data security values (the updated second data security value USV2 and the updated third data security value USV3) from the plurality of proximate user devices (the second user device 102 and the third user device 103), the first user device 101 may determine an updated data security value based at least upon evaluating the plurality of additional data security values associated with the plurality of proximate user devices. The first user device 101 may also determine the first updated data security value USV1 based on the first data security value SV1. For example, the updated data security value may be determined to be the average of the plurality of additional data security values and the first data security value SV1. The updated data security value may be equal to $$\frac{3+5+2}{3}=3.33.$$

The updated data security value may be determined to be 4. In other embodiments, the first user device 101 may round down when determining the updated security value, e.g., the updated data security value may be determined to be 3.

After determining the updated data security value, a first user of the first user device 101 may initiate an interaction with a second user of the second user device 102. For example, the first user may agree to transfer payment to the second user in exchange for goods. The first user device 101 may communicate with the second user device 102 to initiate the interaction. In some embodiments, after initiating the interaction, the first user device 101 may perform the above described steps to determine an updated data security value, prior to performing an interaction.

The first user device 101 may then determine whether or not to perform the interaction with the second user device 102 based on at least the updated data security value. In some embodiments, the first user device 101 may determine not to perform an interaction based at least upon the updated data security value if the updated data security value exceeds a predetermined threshold value. The predetermined threshold value may be any suitable value. For example, the updated data security value may be equal to a value of 54 and the predetermined threshold value may be equal to a value of 50. The first user device 101 may compare the updated data security value and the predetermined threshold value. In this example, the first user device 101 may determine that the updated data security value of 54 exceeds the predetermined threshold value of 50. In some embodiments, where the first user device 101 determines that the updated data security value exceeds the predetermined threshold value, the first user device 101 may also decide to become antisocial.

In other embodiments, the first user device 101 may determine to perform the interaction based at least upon the updated data security value if the updated data security value does not exceed a predetermined threshold value. For example, the updated data security value may be equal to a value of 5 and the predetermined threshold value may be equal to a value of 10. The first user device 101 may compare the updated data security value and the predetermined threshold value. In this example, the first user device 101 may determine that the updated data security value of 5 does not exceed the predetermined threshold value of 10. The first user device 101 may then determine to proceed to perform the interaction with the second user device 102.

In some embodiments, the first user device 101 may determine a further updated data security value based at least upon the updated data security value and the interaction. For example, if the first user device 101 determined not to perform the interaction, the first user device 101 may then determine to increase the updated data security value of 11 to the further updated data security value of 16. In another example, if the first user device 101 determined to perform the interaction, then the first user device 101 may determine to increase the updated data security value from a value of 4 to a further updated data security value of 5.

Figure 5:
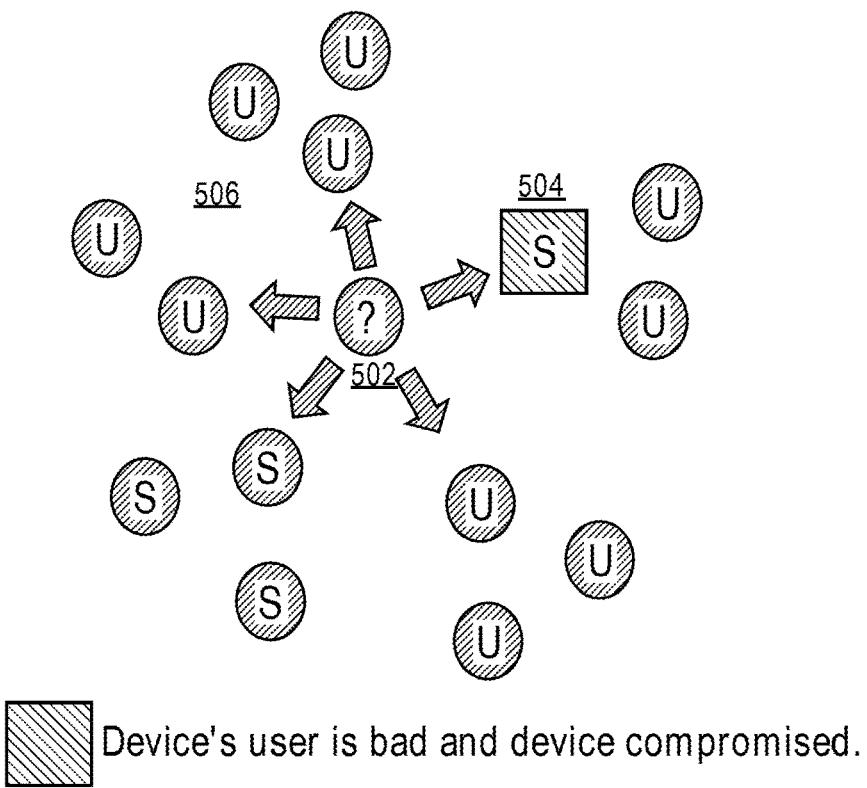
FIG. 5 shows a block diagram illustrating the sociability of devices according to an embodiment of the invention.

FIG. 5 shows a block diagram illustrating sociability of devices according to an embodiment of the invention. FIG. 5 includes a user device 502, a malicious user device 504, as well as a plurality of other user devices 506. The plurality of other user devices 506 are labeled as social S or antisocial U. In this example, there are 10 antisocial user devices and four social user devices.

The malicious user device 504 may be operated by a malicious party. The malicious user device 504 may be social. An interaction involving the malicious user device 504 may result in a fraudulent interaction. However, the user device 502 and the plurality of other user devices 506 may not know that the malicious user device 504 is malicious.

The user device 502 may determine whether to be social or antisocial based on the surrounding user devices including the malicious user device and the plurality of user devices. The user device 502 may first broadcast a sociability request message. The sociability request message may include information regarding the sociability of devices. The sociability request message may be broadcast similarly to the security request message, described above.

After receiving the sociability request message, the plurality of other user devices 506 and the malicious user device 504 may respond to the user device 502 with sociability indicators. The sociability indicators may indicate whether or not the user devices are social. For example, the user device 502 may receive 14 sociability indicators. 4 of the 14 sociability indicators may indicate social user devices and the other 10 sociability indicators may indicate antisocial user devices.

The user device 502 may decide to become antisocial based on the sociability indicators. Since there are many more antisocial user devices than social user devices, the user device 502 may determine that the risk associated with the current mesh network exceeds a predetermined sociability threshold. For example, the sociability threshold may be that 80% of the mesh network needs to be social in order for the user device 502 to determine to be social. The sociability threshold may be any suitable threshold.

In some embodiments, after determining that a potential interaction in the mesh network may be a fraudulent interaction the user device can decide to become antisocial and may not perform interactions in the mesh network. In other embodiments, the user device may terminate all communications after determining potentially fraudulent interactions. In yet other embodiments, after determining potentially fraudulent interactions, the user device can broadcast a message comprising information regarding the potentially fraudulent interactions. Furthermore, the user device can store information regarding the potentially fraudulent interactions in a memory and can later use that information when joining a new mesh network or later rejoining the same mesh network. In some embodiments, if the user device is returned to an online mode, then the user device can transmit the information regarding the potentially fraudulent interactions with a server computer.

Figure 6:
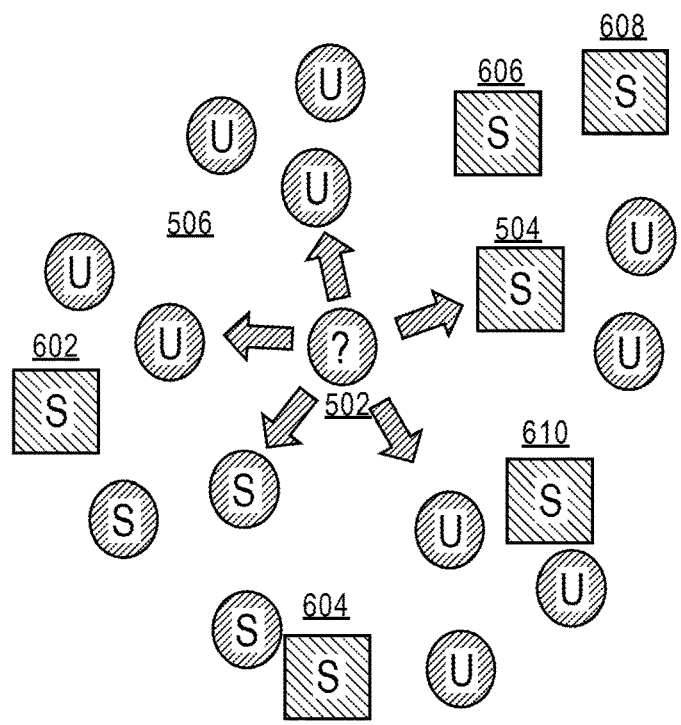
FIG. 6 shows a block diagram illustrating the sociability of devices according to an embodiment of the invention.

FIG. 6 shows a block diagram illustrating sociability of devices according to an embodiment of the invention. FIG. 6 shows the introduction of more social, but malicious, user devices into the mesh network of FIG. 5.

Malicious user devices 602-610 have been introduced into the mesh network of FIG. 5. The user device 502 may wish to determine whether to become social or antisocial based on the surrounding devices.

The user device 502 may broadcast another sociability request message. The plurality of user devices in the mesh network may respond to the sociability request message by broadcasting their sociability indicators.

After receiving a plurality of sociability indicators from the plurality of user devices in the mesh network, the user device 502 may determine whether to be social or antisocial based on the sociability indicators received from the surrounding user devices as well as the history of the sociability indicators in the mesh network. For example, if the user device 502 determines that there was a large influx of social devices into the network, the user device 502 may determine to remain antisocial, as was determined in FIG. 5. The user device 502 may track the number of social devices and the number of antisocial devices in the mesh network. A large increase in social devices may indicate a malicious party that is trying to influence antisocial devices into become social, such as in a Sybil attack.

In some embodiments, a social devices that determines a large increase in social devices may decide to become antisocial. The amount of increase in social devices needed before becoming antisocial may be predetermined (e.g., 4, 9, 30, etc.), or in other embodiments, may be dependent on other variables of the mesh network, such as location.

Embodiments of the invention provide for a number of technical advantages. For example, embodiments allow for a user device to determine a data security value while offline. Additionally, the data security value may be used when determining whether or not to perform an offline interaction, such as a transaction. This is beneficial over previous systems and methods which only allowed interactions to occur online when a remote server computer could determine risk scores associated with the interaction.

Another advantage is that the user devices may decide to become antisocial, thus indicating high data security values to other user devices in the mesh network. This is advantageous because a user of the user device may have outside knowledge of malicious actors. This knowledge can be transferred into the offline mesh network via the user selecting the antisocial mode.

Yet another advantage is the prevention of Sybil attacks in an offline mesh network. For example, a malicious actor may introduce many user devices into the mesh network that broadcast a low data security value. The user device may determine a high data security value since there are many user devices that broadcast low and unchanging data security values.

Conventional systems didn't take into account the risk status of the device in a mesh network and are therefore susceptible to hacking, stealing data, etc. By using security values a user device in a compromised mesh network can determine to shut down or stop communications.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   determining, by a user device, prior to joining a mesh network comprising a plurality of user devices, a first data security value;
   communicating, by the user device, with the plurality of user devices to join the mesh network;
   receiving, by the user device, a plurality of additional data security values from a plurality of proximate user devices;
   determining, by the user device, an updated data security value based at least upon evaluating the plurality of additional data security values associated with the plurality of proximate user devices; and
   allowing or not allowing the user device to perform an interaction based at least upon the updated data security value.

2. The method of claim 1 further comprising:
   broadcasting, by the user device, a security request message to the plurality of user devices.

3. The method of claim 1, wherein the user device enters a geographic location of the plurality of user devices.

4. The method of claim 1, wherein the plurality of additional data security values are determined by the plurality of proximate user devices.

5. The method of claim 1 further comprising:
   determining, by the user device, not to perform an interaction based at least upon the updated data security value if the updated data security value exceeds a predetermined threshold value.

6. The method of claim 1 further comprising:
   determining, by the user device, to perform an interaction based at least upon the updated data security value if the updated data security value does not exceed a predetermined threshold value.

7. The method of claim 6 further comprising:
   performing, by the user device, the interaction with a second user device of the plurality of user devices; and
   determining, by the user device, a further updated data security value based at least upon the updated data security value and the interaction.

8. The method of claim 1, wherein allowing or not allowing the user device to perform an interaction based at least upon the updated data security value further comprises:
   determining, by the user device, whether to become social or antisocial.

9. A user device comprising:
   a processor;
   a memory device; and
   a computer-readable medium coupled to the processor, the computer-readable medium comprising code executable by the processor for implementing a method comprising:
   determining prior to joining a mesh network comprising a plurality of user devices, a first data security value;
   communicating with the plurality of user devices to join the mesh network;
   receiving a plurality of additional data security values from a plurality of proximate user devices;
   determining an updated data security value based at least upon evaluating the plurality of additional data security values associated with the plurality of proximate user devices; and
   allowing or not allowing the user device to perform an interaction based at least upon the updated data security value.

10. The user device of claim 9, wherein the method further comprises:
    broadcasting a security request message to the plurality of user devices.

11. The user device of claim 9, wherein the user device enters a geographic location of the plurality of user devices.

12. The user device of claim 9, wherein the plurality of additional data security values are determined by the plurality of proximate user devices.

13. The user device of claim 9, wherein the method further comprises:
    determining not to perform an interaction based at least upon the updated data security value if the updated data security value exceeds a predetermined threshold value.

14. The user device of claim 9, wherein the method further comprises:
    determining to perform an interaction based at least upon the updated data security value if the updated data security value does not exceed a predetermined threshold value.

15. The user device of claim 14, wherein the method further comprises:
    performing the interaction with a second user device of the plurality of user devices; and
    determining a further updated data security value based at least upon the updated data security value and the interaction.

16. The method of claim 9, wherein allowing or not allowing the user device to perform an interaction based at least upon the updated data security value further comprises:
    determining whether to become social or antisocial.

17. A method comprising:
    receiving, by a user device, a security request message from a first user device;
    broadcasting, by the user device, the security request message;
    receiving, by the user device, a plurality of data security values from proximate user devices that received the broadcasted security request message;
    determining, by the user device, a data security value based at least upon evaluating the plurality of data security values; and
    broadcasting, by the user device, the data security value, wherein the first user device receives the data security value.

18. The method of claim 17 further comprising:
    receiving, by the user device, interaction data from the first user device; and determining, by the user device, to perform an interaction based at least upon the data security value.

* * * * *